United States Patent
Mao et al.

(10) Patent No.: US 9,031,548 B2
(45) Date of Patent: May 12, 2015

(54) METHOD AND SYSTEM FOR OBTAINING A CONFIGURATION PROFILE

(71) Applicants: Joseph Wenhow Mao, Sunnyvale, CA (US); Richard Lee Slater, Sunnyvale, CA (US)

(72) Inventors: Joseph Wenhow Mao, Sunnyvale, CA (US); Richard Lee Slater, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 105 days.

(21) Appl. No.: 13/954,871

(22) Filed: Jul. 30, 2013

(65) Prior Publication Data
US 2015/0038130 A1    Feb. 5, 2015

(51) Int. Cl.
*H04W 4/22* (2009.01)
*H04W 8/22* (2009.01)
*H04W 24/00* (2009.01)

(52) U.S. Cl.
CPC ............... *H04W 8/22* (2013.01); *H04W 24/00* (2013.01)

(58) Field of Classification Search
CPC ....... H04W 4/22; H04W 8/245; H04W 88/02; H04W 4/02; H04W 64/00; H04W 8/22; H04W 24/00
USPC ............... 455/404.2, 414.1, 418–420, 456.1, 455/456.3, 67.11, 550.1, 556.2, 557, 507
See application file for complete search history.

(56) References Cited

U.S. PATENT DOCUMENTS

| | | | |
|---|---|---|---|
| 8,332,203 B1 * | 12/2012 | Poulin | 703/22 |
| 2008/0040713 A1 * | 2/2008 | Subbakrishna et al. | 717/173 |
| 2010/0304872 A1 * | 12/2010 | Gatto et al. | 463/43 |
| 2011/0159902 A1 * | 6/2011 | Ramer et al. | 455/507 |

OTHER PUBLICATIONS

International Search Report issued in corresponding International Application No. PCT/US2013/053025 dated Mar. 27, 2014 (10 pages).
Written Opinion issued in corresponding International Application No. PCT/US2013/053025 dated Mar. 27, 2014 (4 pages).

* cited by examiner

*Primary Examiner* — Babar Sarwar
(74) *Attorney, Agent, or Firm* — Osha Liang LLP

(57) ABSTRACT

A method for obtaining a configuration profile, including obtaining test results for customer-tested configuration profiles, including operable configuration profiles, from customer mobile devices. A shared data repository is populated with the test results and the customer-tested configuration profiles. The customer-tested configuration profiles are related to customer mobile device profiles of the customer mobile devices. A target mobile device profile, describing mobile device properties, is received from a target mobile device. A subset of the customer mobile device profiles having a threshold degree of similarity to the target mobile device profile are selected from the shared data repository. For each of the operable configuration profiles in the subset, a probability of compatibility is calculated, and the operable configuration profiles in the subset are tested on the target mobile device in an order defined by the probability of compatibility. The shared data repository is updated with the modified test result.

20 Claims, 6 Drawing Sheets

METHOD AND SYSTEM FOR OBTAINING A CONFIGURATION PROFILE

BACKGROUND

Mobile devices are computing devices that provide functionality for users. Mobile devices may be connected to peripheral devices. The peripheral device may provide additional functionality to the mobile device. The peripheral devices may be connected to mobile devices using many technologies, including an audio jack located on the mobile device, bluetooth, and others. A peripheral device may be compatible with many different types of mobile device. Further, different mobile devices of the same type may include different versions of hardware components or software used for communication with the mobile device. Additionally, different types of mobile device may be configured differently than other types in order to communicate with the peripheral device.

SUMMARY

In general, in one aspect, the invention relates to a method for obtaining a configuration profile. The method includes obtaining, from customer mobile devices, test results for customer-tested configuration profiles, where the customer-tested configuration profiles include operable configuration profiles. The method further includes populating a shared data repository with the test results and the customer-tested configuration profiles, where the customer-tested configuration profiles are related in the shared data repository to customer mobile device profiles of the customer mobile devices. The method further includes receiving, from a target mobile device, a target mobile device profile. The target mobile device profile describes mobile device properties of the target mobile device. From the shared data repository, a subset of the customer mobile device profiles is selected based on each customer mobile device profile in the subset having a threshold degree of similarity to the target mobile device profile. Further, the method includes calculating, for each of the operable configuration profiles defined for the subset, a probability of compatibility with the target mobile device, testing, in an order defined by the probability of compatibility, the operable configuration profiles defined for the subset to obtain a modified test result, and updating the shared data repository with the modified test result.

In general, in one aspect, the invention relates to a system for obtaining a configuration profile. The system includes a computer processor, a shared data repository storing customer mobile device profiles representing customer mobile devices, and customer-tested configuration profiles, including operable configuration profiles, and a server configuration tool, executing on the computer processor. The server configuration tool includes functionality to obtain, from the customer mobile devices, test results for the customer-tested configuration profiles and to populate the shared data repository with the test results. The customer-tested configuration profiles are related in the shared data repository to the customer mobile device profiles. The server configuration tool further includes functionality to receive, from a target mobile device, the target mobile device profile, where the target mobile device profile describes properties of the target mobile device, select, from the shared data repository, a subset of the customer mobile device profiles based on each customer mobile device profile in the subset having a threshold degree of similarity to the target mobile device profile, calculate, for each of the operable configuration profiles defined for the subset, a probability of compatibility with the target mobile device, test, in an order defined by the probability of compatibility, on the target mobile device, the operable configuration profiles defined for the subset to obtain a modified test result, and update the shared data repository with the modified test result.

In general, in one aspect, the invention relates to a non-transitory computer readable medium storing instructions for obtaining a configuration profile. The instructions include functionality to obtain, from customer mobile devices, test results for customer-tested configuration profiles. The customer-tested configuration profiles include operable configuration profiles. The instructions further include functionality to populate a shared data repository with the of test results and the of customer-tested configuration profiles, where the customer-tested configuration profiles are related in the shared data repository to customer mobile device profiles of the of customer mobile devices. The instructions further include functionality to receive, from a target mobile device, a target mobile device profile, where the target mobile device profile describes mobile device properties of the target mobile device. From the shared data repository, a subset of the customer mobile device profiles is selected based on each customer mobile device profile in the subset having a threshold degree of similarity to the target mobile device profile. The instructions include functionality to calculate, for each of the operable configuration profiles defined for the subset, a probability of compatibility with the target mobile device, test, in an order defined by the probability of compatibility, the operable configuration profiles defined for the subset to obtain a modified test result, and update the shared data repository with the modified test result.

Other aspects of the invention will be apparent from the following description and the appended claims.

DETAILED DESCRIPTION

Figure 1:
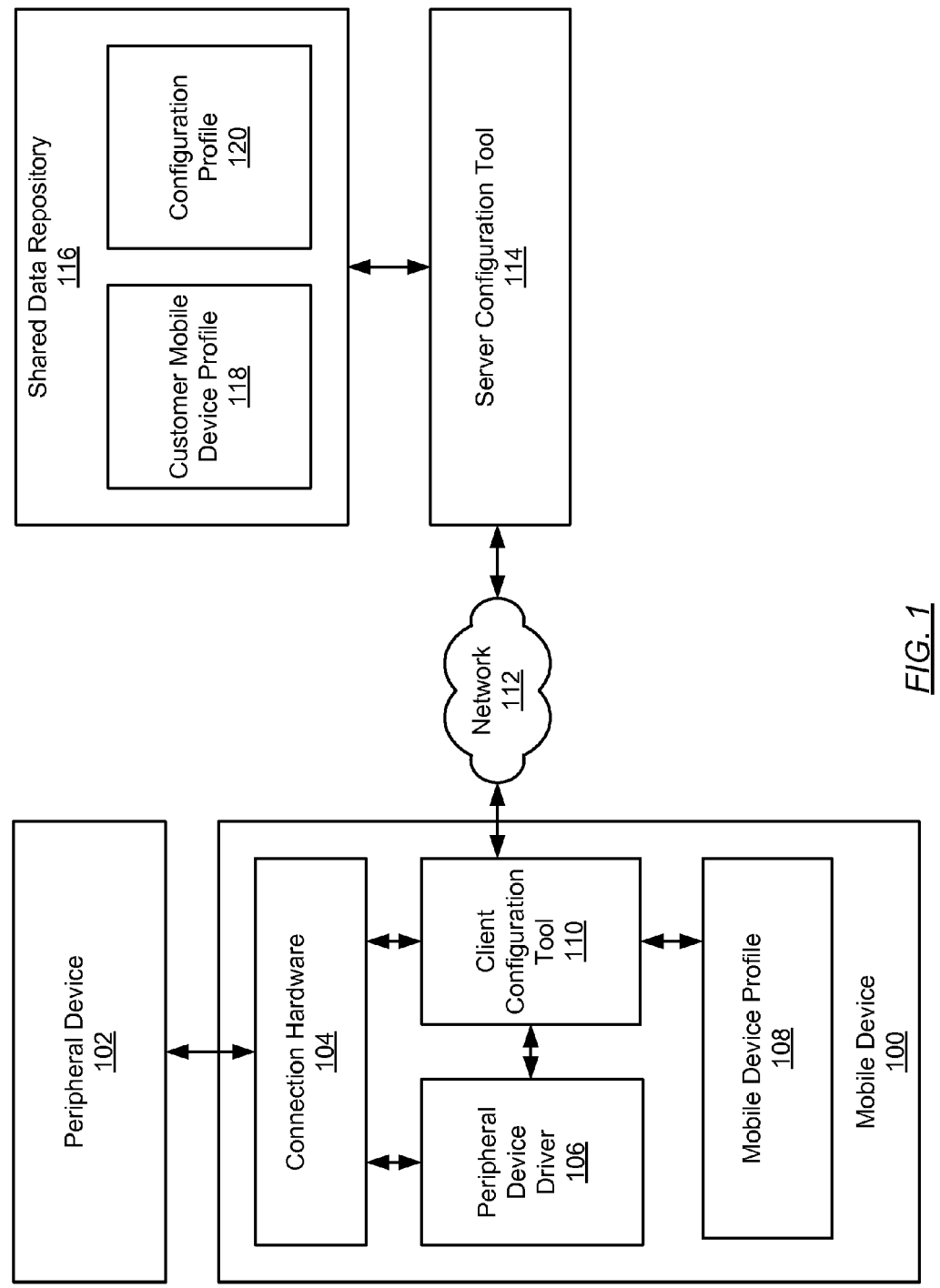
FIG. 1 shows a schematic diagram of a system in accordance with one embodiment of the invention.

Specific embodiments of the invention will now be described in detail with reference to the accompanying figures. Like elements in the various figures are denoted by like reference numerals for consistency. Further, the use of "Fig." in the drawings is equivalent to the use of the term "Figure" in the description.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for obtaining a configuration profile compatible with a target mobile device. The configuration profile is used to configure the mobile device to connect to a peripheral device. Specifically, embodiments of the invention gather customer-test configuration profiles from many customer mobile devices to determine which configuration profiles operate on which mobile devices. A shared data repository is populated with customer mobile device profiles of the customer mobile devices, and the customer-tested configuration profiles. The customer-tested configuration profiles are related to the customer mobile device profiles and include the test results.

The target mobile device includes properties describing various aspects of the mobile device hardware and software. The properties are used to create a mobile device profile of the target mobile device. The target mobile device profile is compared against customer mobile device profiles stored in a shared data repository. Based on customer mobile device profiles having a threshold degree of similarity to the target mobile device profile, a probability of compatibility with the target mobile device is identified for each of the configuration profiles in the shared data repository. In some embodiments of the invention, one or more additional custom configuration profiles may be generated based on specific target mobile device properties. The configuration profiles are tested on the target mobile device in order of the probability of compatibility until an operable configuration profile is determined in accordance with one or more embodiments of the invention. The shared data repository is updated based on the results of the tests. Further, the target mobile device may be configured using the compatible configuration profile.

In one or more embodiments of the invention, a customer is an end-user of a peripheral device and/or customer mobile device. For example, the customer may be a purchaser of the peripheral device and/or software on the mobile device. Further, the customer may be a person, a business entity, an organizational entity, or another entity. In one or more embodiments of the invention, the customer uses functionality of the peripheral device for personal use or for use of the business with which the customer is employed.

FIG. 1 shows a schematic diagram of a system in accordance with one embodiment of the invention. As shown in FIG. 1, the system includes several components including a mobile device (100) connected to a peripheral device (102) via connection hardware (104). A peripheral device driver (106) and client configuration tool (110) may execute on the mobile device (100). The client configuration tool (110) is connected to a server configuration tool (114) over a network (112) accessible to the mobile device (100). The server configuration tool (114) is capable of accessing a shared data repository (116) storing customer mobile device profiles (118) and operable configuration profiles (120).

While FIG. 1 shows a configuration of components, other configurations may be used without departing from the scope of the invention. For example, various components may be combined to create a single component. As another example, the functionality performed by a single component may be performed by two or more components. The components shown in FIG. 1 are discussed in accordance with one or more embodiments of the invention below.

In one or more embodiments of the invention, a mobile device (100) may be a cell phone, smart phone, table personal computer (PC), notebook PC or other type of portable consumer electronic. The mobile device (100) may include an internet connection or connection to a cellular network or other network of devices. The mobile device (100) may be any of a number of distinct types of device including different brands, models, components, software and hardware. Specifically, although FIG. 1 shows only a single mobile device connected to the configuration tool (110), multiple heterogeneous mobile devices (100) may be connected to the configuration tool (110). Each of the heterogeneous mobile devices (100) may be of a same type or different type than one or more of the other mobile devices (100).

In one or more embodiments of the invention, the mobile device (100) may include one or more computer processor(s), associated memory (e.g., random access memory (RAM), cache memory, flash memory, etc.), one or more storage device(s) (506) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor. The mobile device (100) may also include one or more input device(s), such as a touchscreen, keyboard, mouse, microphone, touchpad, electronic pen, or any other type of input device. Further, the mobile device (100) may include one or more output device(s), such as a screen (e.g., a liquid crystal display (LCD), a plasma display, touchscreen, projector, or other display device), a printer, external storage, or any other output device. One or more of the output device(s) may be the same or different from the input device(s).

In one or more embodiments of the invention, a peripheral device (102) is connected to the mobile device (100). The peripheral device (102) may be physically attached to the mobile device (100) or may be accessed remotely. The peripheral device (102) may be a piece of hardware which provides additional functionality for the mobile device (100). Alternatively, the peripheral device (102) may be another mobile device (100) or other independently functioning device. In one or more embodiments of the invention, the peripheral device (102) may be integrated directly into the mobile device (100). The peripheral device (102) may be, for example, a keyboard mouse, touch pad, fingerprint scanner, camera, microphone, magnetic card reader, radio-frequency identification (RFID) reader, barcode scanner, portable storage device, disc reader or one any other type of input device. The peripheral device (102) may also be a display, speaker or speakers, radio transmitter, a physical or wireless network adapter, a router, or networked device.

In one or more embodiments of the invention, the mobile device (100) may include connection hardware (104) in order to facilitate communication with the peripheral device (102). The peripheral device (102) may connect to the mobile device (100) using a physical connection, such as an audio jack or Ethernet jack, Universal Serial Bus (USB) port, high-definition multimedia interface (HDMI) port, or some other type of connecter built in to the mobile device (100). Alternatively, the peripheral device (102) may connect wirelessly using Bluetooth, IEEE 802.11, or some other wireless standard. The connection may be subject to a number of settings, parameters, configurations and limitations of the connection hardware (104). The settings may be altered by the user or may be inherent to the connection hardware (104). The connection hardware (104) may be configured directly, or the configuration may be affected in software that is managing or utilizing the connection hardware (104).

In one or more embodiments of the invention, a peripheral device driver (106) is executing on the mobile device (100). The peripheral device driver (106) may be software installed by the user on the mobile device (100). The peripheral device driver (106) may be an aspect of the operating system, or a distinct application installed by a user. The peripheral device driver (106) may include functionality to access and configure the connection hardware (104) and other components of the mobile device (100) directly. Alternatively, the peripheral device driver (106) may only pass data and instructions to the mobile device (100), with the data and instructions including the appropriate format, settings, and configuration to communicate with the peripheral device (102). In one or more embodiments of the invention, the peripheral device driver (106) may include additional functionality, such as a user interface, information storage, or access to a third-party system.

In one or more embodiments of the invention, the mobile device (100) includes a mobile device profile (108) by which the mobile device (100) is identified. The mobile device profile (108) may be a single file, number or other identifier which is uniquely identified with the mobile device (100). Alternatively, the mobile device profile (108) may be a group of properties describing the mobile device (100). For example, the group of properties may include the device manufacturer, the chipset manufacturer, the specific chipset, the model family, the specific model, the operating system, the operating system version, processing speed, memory and storage capacities, network connection capabilities, and/or any other information about the mobile device (100) or combination thereof.

In one or more embodiments of the invention, configuration settings of the mobile device (100) define adjustments to software and/or hardware of the mobile device (100) in order to connect the mobile device (100) with the peripheral device (102). The configuration settings may be stored in a single file or set of files in a location which are accessed by the appropriate components of the mobile device (100).

In one or more embodiments of the invention, the mobile device (100) includes functionality to execute the client configuration tool (110). The client configuration tool (110) may include functionality to configure the peripheral device driver (106), the mobile device (100), the distinct components of the mobile device (100), the connection hardware (104), and/or the peripheral device (102). In one or more embodiments of the invention, the client configuration tool (110) may be integrated directly with the peripheral device driver (106). In one or more embodiments of the invention, the client configuration tool (110) may only update a file or list storing the configuration settings of the mobile device (100). The client configuration tool (110) may include functionality to pass an operable configuration profile to the peripheral device driver (106). Alternatively, the client configuration tool (110) may include functionality to directly modify the peripheral device driver (106) or the components of the mobile device (100). In one or more embodiments of the invention, the client configuration tool (110) is controlled directly by a server configuration tool (114). Alternatively, the client configuration tool (110) may include functionality to execute autonomously.

In one or more embodiments of the invention, the client configuration tool (110) may include a local data repository, which may include a limited list of customer mobile device profiles (118) and configuration profiles (120). The client configuration tool (110) may include functionality to utilize the local data repository in a similar manner to the shared data repository (116). In one or more embodiments of the invention, the client configuration tool (110) may include functionality to update the local data repository based on changes to the shared data repository (116).

The client configuration tool (110) may include functionality to collect information describing properties of the mobile device (100) and obtain the mobile device profile (108). The client configuration tool (110) may pass the collected mobile device profile (108) to the server configuration tool (114), and to receive the operable configuration profiles (120) from a server configuration tool (114) via a network connection. Alternatively, or additionally, the client configuration tool (110) may store one or more operable configuration profiles (120) which are used to test for compatibility with the mobile device (100). The client configuration tool (110) may include functionality to analyze the collected properties, and select an operable configuration profile (120), or generate a custom configuration profiles (120) based upon the collected properties. The client configuration tool (110) may include functionality to manage the testing of configuration profiles on the mobile device (100).

In one or more embodiments of the invention the client configuration tool (110) includes functionality to communicate with a server configuration tool (114) over a network (112). The network (112) may be, or be accessed via, a cellular data network, a local area network, or the internet or another wide area network. In one embodiment of the invention, the mobile device (100) may have a direct connection to the server configuration tool (114). The client configuration tool (110) may access the network (112) directly or via a connection of the mobile device (100).

The server configuration tool (114) may be hardware, software, firmware, or a combination thereof to which the mobile device (100) connects via a network (112). In one embodiment of the invention, the server configuration tool (114) may be one or more servers executing software for remotely configuring mobile devices (100). The server configuration tool (114) may be one or more applications executing on the one or more servers. The servers may be controlled by the entity managing the server configuration tool (114), or controlled by a third party. The server configuration tool (114) may include functionality to directly control the client configuration tool (110). Alternatively, or additionally, the server configuration tool (114) may include functionality to pass operable configuration profiles (120) to the client configuration tool (110) and to receive collected parameters of the mobile device (100) from the client configuration tool (110).

The server configuration tool (114) may include, be connected to, or include functionality to access, a shared data repository (116). The server configuration tool (114) may include functionality to search the shared data repository (116) for customer mobile device profiles (118) and operable configuration profiles (120). The server configuration tool (114) may further include functionality to read and write the shared data repository (116).

Figure 5:
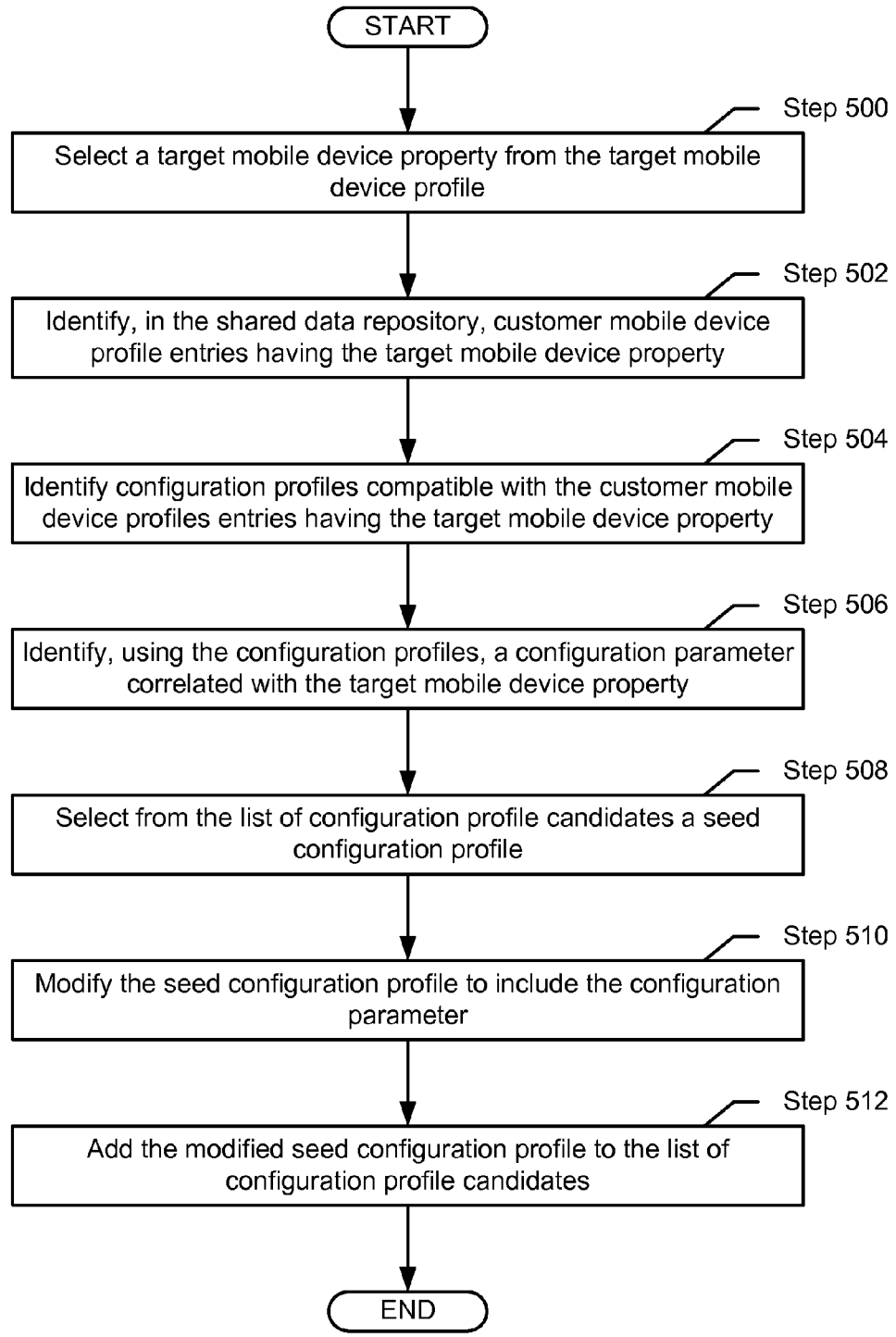
FIG. 5 shows a flowchart for generating a custom configuration profile in accordance with one embodiment of the invention.

The server configuration tool (114) may correspond to and/or may implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention. For example, as shown in FIG. 5, the computing system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor (s) may be one or more cores, or micro-cores of a processor. The computing system may also include one or more input device(s), such as a touchscreen, keyboard, mouse, microphone, touchpad, electronic pen, or any other type of input device. Further, the computing system may include one or more output device(s), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system may be connected to network (112) (e.g., a local area network (LAN), a wide area network (WAN) such as the Internet, mobile network, or any other type of network or combination thereof) via a network interface connection. The input and output device(s) may be locally or remotely (e.g., via the network) connected to the computer processor(s), memory, and storage device(s). Many different types of computing systems exist, and the aforementioned input and output device(s) may take other forms.

In one or more embodiments of the invention, the configuration tool (114) is connected to a shared data repository (116). The shared data repository (116) may be a centralized data repository where customer mobile device profiles (118) for all customer mobile devices tested are stored. The shared data repository (116) may include the configuration profiles (120) tested on the customer mobile devices, any additional data describing relationships between the customer mobile device profiles (118) and configuration profiles (120) collected, and results of configuration profile (120) compatibility tests.

The shared data repository (116) is any type of storage unit and/or device (e.g., a file system, database, collection of tables, or any other storage mechanism) for storing data. Further, the shared data repository (116) may include multiple different storage units and/or devices. The multiple different storage units and/or devices may or may not be of the same type or located at the same physical site. In one or more embodiments of the invention, the data repository (116), or a portion thereof, is secure.

As discussed above, in one or more embodiments of the invention, a local data repository may be located on the mobile device (100). The local data repository may store a subset of the contents of the shared data repository. The subset may be particularly rigorously tested or specifically approved customer mobile device profiles (118) and related configuration profiles (120). In one or more embodiments of the invention, the shared data repository (116) may be periodically updated based on changes to the local data repositories. In one or more embodiments of the invention, the shared data repository (116) may be distributed across multiple mobile devices (100) and changes or updates are pushed to every mobile device (100) directly, rather than to a centralized shared data repository (116).

In one or more embodiments of the invention, the shared data repository (116) stores customer mobile device profiles (118). The customer mobile device profiles (118) are data structures stored in the shared data repository (116). A customer mobile device profile (118) may include parameters describing a customer mobile device. Specifically, the customer device profiles may correspond to the mobile device profile for customer mobile devices. Thus, the customer device profile may include the same or similar parameters as discussed above with respect to the mobile device profile. The parameters may be collected by a client configuration tool on the customer mobile device as described above. The customer mobile device profile (118) may also include a list of the operable configuration profiles stored within the shared data repository (116) which have been tested on the same or similar mobile device (100). Customer mobile device profiles (118) are discussed in greater detail in the description of FIG. 2A below.

In one or more embodiments of the invention, the shared data repository (120) stores configuration profiles (120). The configuration profiles (120) may include operable configuration profiles and/or inoperable configuration profiles. Operable configuration profiles are data structures which include a set of configuration parameters which has been successfully tested and shown to function on a customer mobile device (e.g. mobile device (100)). The operable configuration profiles (120) may be created and added to the shared data repository (116) by the client configuration tool (106).

In addition to the customer mobile device profiles (116) and the configuration profiles (118), the shared data repository (114) may store additional data, or may store the same data in alternate formats. In one or more embodiments of the invention, a configuration profile (118) may include data describing the types of devices on which the configuration profile (118) is operable. Additionally, a configuration profile (118) may include pre-calculated statistics on compatibility with specific mobile devices (100). The shared data repository (114) may also store data describing correlations between individual device and configuration parameters.

Figure 2B:
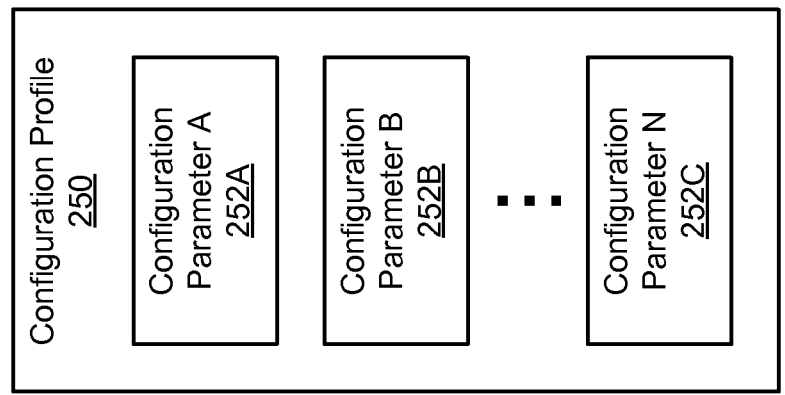
FIGS. 2A and 2B show schematic diagrams of a device profile entry and a configuration profile in accordance with one embodiment of the invention.
Figure 2A:
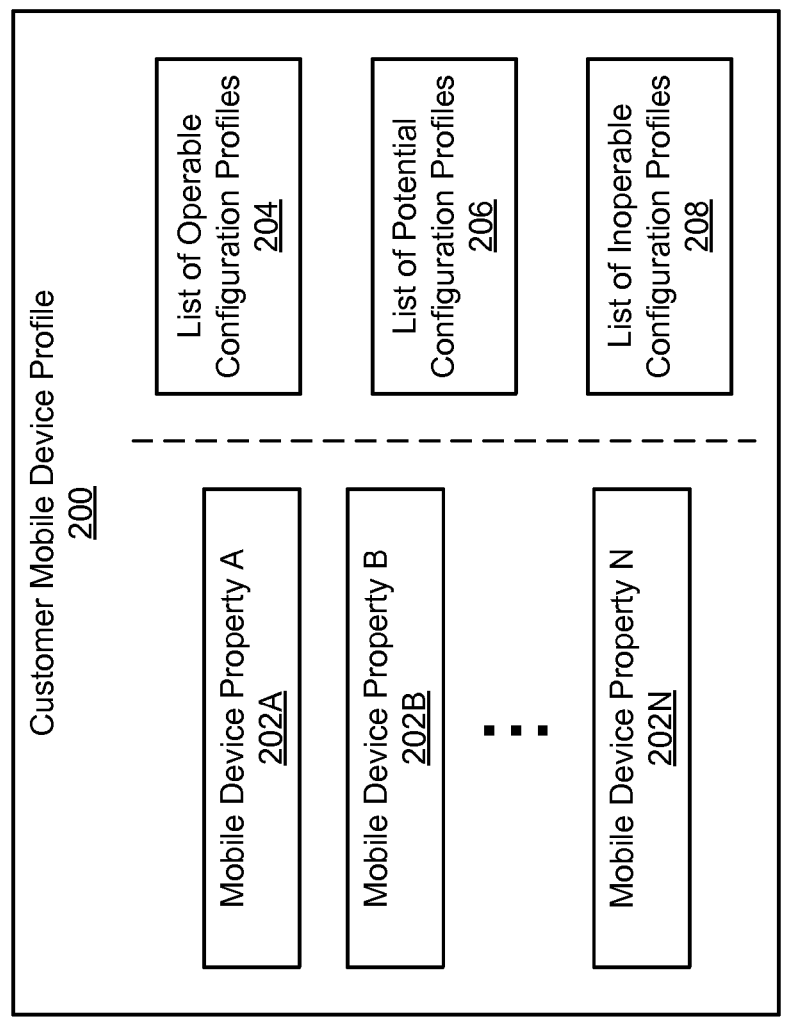

FIG. 2A shows a schematic diagram for a customer mobile device profile (200) in accordance with one embodiment of the invention. As shown in FIG. 2A, the customer mobile device profile (200) includes mobile device properties (e.g., mobile device property A (202A), mobile device property B (202B), mobile device property N (202N)), a list of operable configuration profiles (204), and a list of inoperable configuration profiles (206). A customer mobile device profile (200) may be obtained by a client configuration tool executing upon the customer mobile device. A customer mobile device profile (200) may be an existing data structure stored within the customer device which is obtained by the client configuration tool and written to the shared data repository. Alternatively, the client configuration tool may collect the mobile device properties directly from the respective components of the mobile device and create a customer mobile device profile (200). In one or more embodiments of the invention, a single customer mobile device profile (200) storing the aggregated results of every test performed on a mobile device of a particular type may exist. Alternatively, a separate customer mobile device profile (200) may exist in the shared data repository storing the individual results for each customer mobile device tested.

In one or more embodiments of the invention, the multiple mobile device properties are pieces of information which describe different aspects of the mobile device. The mobile device properties may include those discussed above in the description of FIG. 1, including manufacturer, chipset, model and serial number, operating system, date of creation, processing capacity, the amount of memory, the available storage, and/or other information or combinations thereof. Additional mobile device properties may be include information about the connection hardware of the mobile device, the manufacturer and serial number of the connection hardware, available frequency and power tolerances, possible data transfer speeds, the driver versions for the connection hardware, specifications for formatting data passed over the connection hardware, technical limitations, and other information.

Different customer mobile device profiles (200) may include different sets of mobile device properties. A fixed set of mobile device properties may be collected from each customer mobile device. In one or more embodiments of the invention, certain mobile device properties may be conditionally collected from a particular customer mobile device based on other mobile device properties of the particular customer mobile device. In one or more embodiments of the invention, the mobile device properties stored within a single customer mobile device profile (200).

In one or more embodiments of the invention, the customer mobile device profile (200) includes a list of operable configuration profiles (204), a list of potential configuration profiles (206), and a list of failed configuration profiles (208). The list of operable configuration profiles (204) and the list of failed configuration profiles (208) respectively represent the configuration profiles tested on the customer mobile device. The list of potential configuration profiles (206) may represent configuration profiles (250) which have not been tested on the customer mobile device. Alternatively, the potential configuration profiles (206) may be configuration profiles (250) which have been tested on the customer mobile device, but without consistent results (e.g., found successful sometimes and found unsuccessful at other times).

If a customer mobile device profile (200) represents a single customer mobile device, the list of operable configuration profiles (204) and the list of failed configuration profiles (208) represent the results of the tests performed on the single customer mobile device. If a customer mobile device profile (200) represents the results of all the tests performed a single type of mobile device, instead of lists of inoperable and operable configuration profiles, the customer mobile device profile (200) may include a list of all the configuration profiles tested on the particular type of mobile device, as well as a success rate for the particular configuration profile. The list of operable configuration profiles (204), list of potential configuration profiles (206), and list of inoperable configuration profiles (208) may be determined based on a confidence of the configuration profiles (250) functioning on that type of customer mobile device. The confidence may be determined based on a percentage of tests successfully performed on that type of customer mobile device using the configuration profile (250). In one or more embodiments of the invention, confidence may be determined based on the percentage of connection attempts in which a connection was successfully established on a single customer mobile device. In one or more embodiments of the invention, a device profile (200) may further include additional information, such as individual configuration parameters, which are required by the mobile device.

FIG. 2B shows a schematic diagram of a configuration profile (250) in accordance with one embodiment of the invention. The configuration profile (250) includes multiple configuration parameters (e.g., configuration parameter A (252A), configuration parameter B (252B), configuration parameter N (252N)) which are used to configure the mobile device to connect to the peripheral device. For example, the configuration parameters may include connection settings of a mobile device, a peripheral device driver and the connection hardware to allow the mobile device to successfully connect to a peripheral device. A configuration parameter may include a flag, a value, a set of values, a data structure, an equation or function, a portion of computer code, or a complete application, which is used to configure a particular component of the mobile. In one or more embodiments of the invention, a configuration parameter may include a procedure for initializing or utilizing a component of the mobile device. Different configuration profiles may include different sets of configuration parameters. In one or more embodiments of the invention, individual configuration parameters may be associated with a specific device profile or mobile device property rather than as a part of a configuration profile (250). Configuration properties may also be associated with values which indicate how critical they are to successful establishing a connection between a mobile device and a peripheral device.

FIGS. 3A-5 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. In addition, steps such as store acknowledgements have been omitted to simplify the presentation. Further, one or more of the steps of the FIGS. 3A-5 may be performed by the computer processors discussed above with reference to FIG. 1.

Figures 3A, 3B:
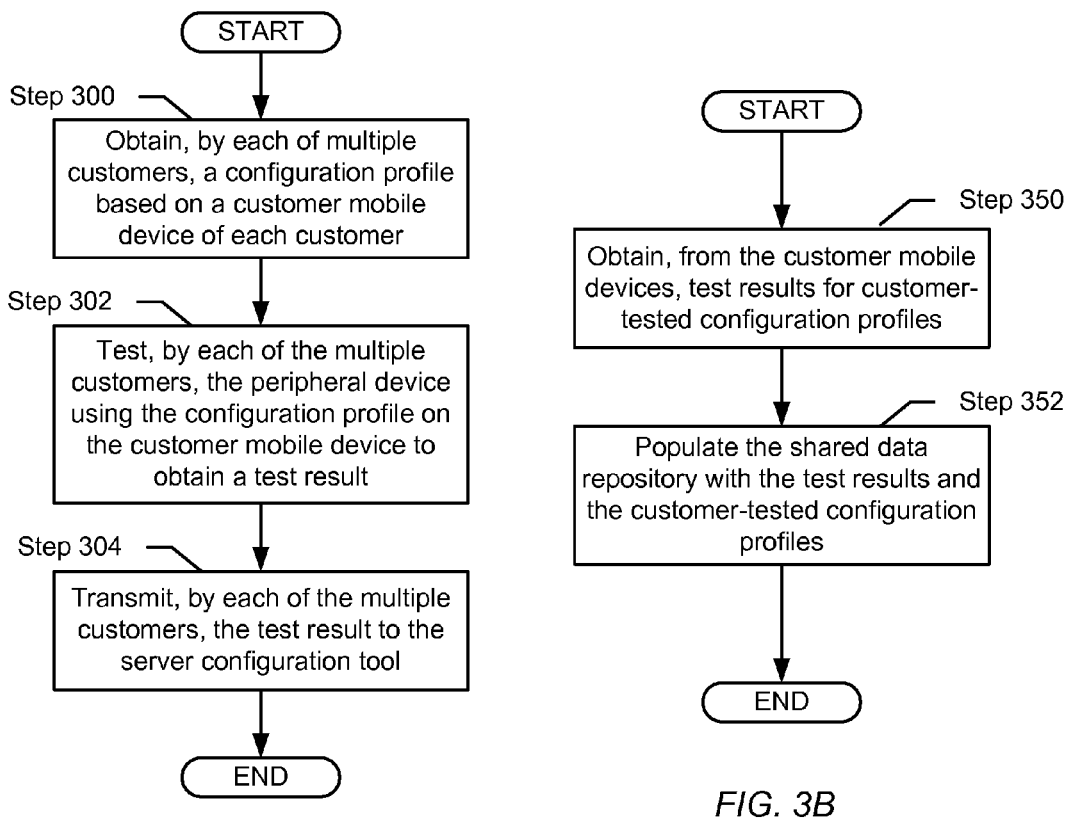
FIGS. 3A and 3B show flowcharts for populating a data repository in accordance with one embodiment of the invention.

FIG. 3A shows a flowchart describing a method for testing a configuration profile on multiple customer mobile devices in accordance with one embodiment of the invention. In Step 300, multiple distinct customers obtain a configuration profile from the configuration tool based upon their respective customer mobile devices. Alternatively, or additionally, the configuration profiles may be automatically provided by the configuration tool regardless of the type of customer mobile device. The customer mobile devices may automatically obtain the configuration profile as a result of an application being installed or initialized on the mobile device. Alternatively, the customers may obtain the configuration profiles manually. For example, when a customer purchases the peripheral device, the customer may obtain a configuration profile for connecting to the peripheral device. The configuration profile may be a self-generated or obtained from the shared data repository.

In Step 302, each of the multiple customers tests the configuration profile on the customer mobile device. In one or more embodiments of the invention, testing the configuration profile includes configuring the mobile device, peripheral device driver, and connection hardware according to the parameters specified by the configuration profile, and attempting to communicate with the peripheral device. The configuration profile may be tested in a same or similar manner as discussed below with reference to FIG. 4.

In Step 304, each of the customers transmits the result of the test on the relevant customer mobile device back to the configuration tool. The test results are aggregated and analyzed by the configuration tool. In one or more embodiments of the invention, the test result may be whether the mobile device is correctly able to connect and use the functionality of the peripheral device, a percentage of time in which the customer mobile device is able to connect and use the peripheral device, any error messages generated by the connection with the peripheral device and other tracking information. The customer-tested configuration profiles may be transmitted to the shared data repository with the test result. Alternatively, the test result may include an identifier of the customer-tested configuration profile that is located in the shared data repository.

FIG. 3B shows a flowchart describing a method for populating the shared data repository with customer mobile device profiles and configuration profiles in accordance with one embodiment of the invention.

In Step 350, the server configuration tool obtains the test results from the customer mobile devices on which the tests were performed. The customer mobile devices may indicate whether the configuration profile was operable or not. If a customer mobile device did not transmit the customer mobile device profile to the configuration tool prior to obtaining the configuration profile, the customer mobile device profile may be obtained along with the test result. Other mobile device properties which were not necessary for identifying the customer mobile device to the configuration tool, but which may be related to the operability of the configuration file may also be obtained.

In Step 352, the shared data repository is populated by the configuration tool with the test results. Populating the shared data repository may include adding new entries corresponding to each of the customer mobile devices which were tested. In one or more embodiments of the invention, the populating may additionally include analyzing the test results obtained from all of the customers and associating the configuration profile, or individual configuration parameters with specific mobile device properties. The associations between a device profile and the configuration profile or configuration parameters may be weighted according to a success rate on the particular type of mobile device.

In one or more embodiments of the invention, the shared data repository may initially be populated manually using approved configuration profiles which have been verified to function on certain mobile devices. The verification and initial population may be done by a manufacturer of the mobile device, a manufacturer of the peripheral device, a manufacturer of the connection hardware, a developer of driver software, a developer of the operating system, or a third party managing the server configuration tool and shared data repository.

Figure 4:
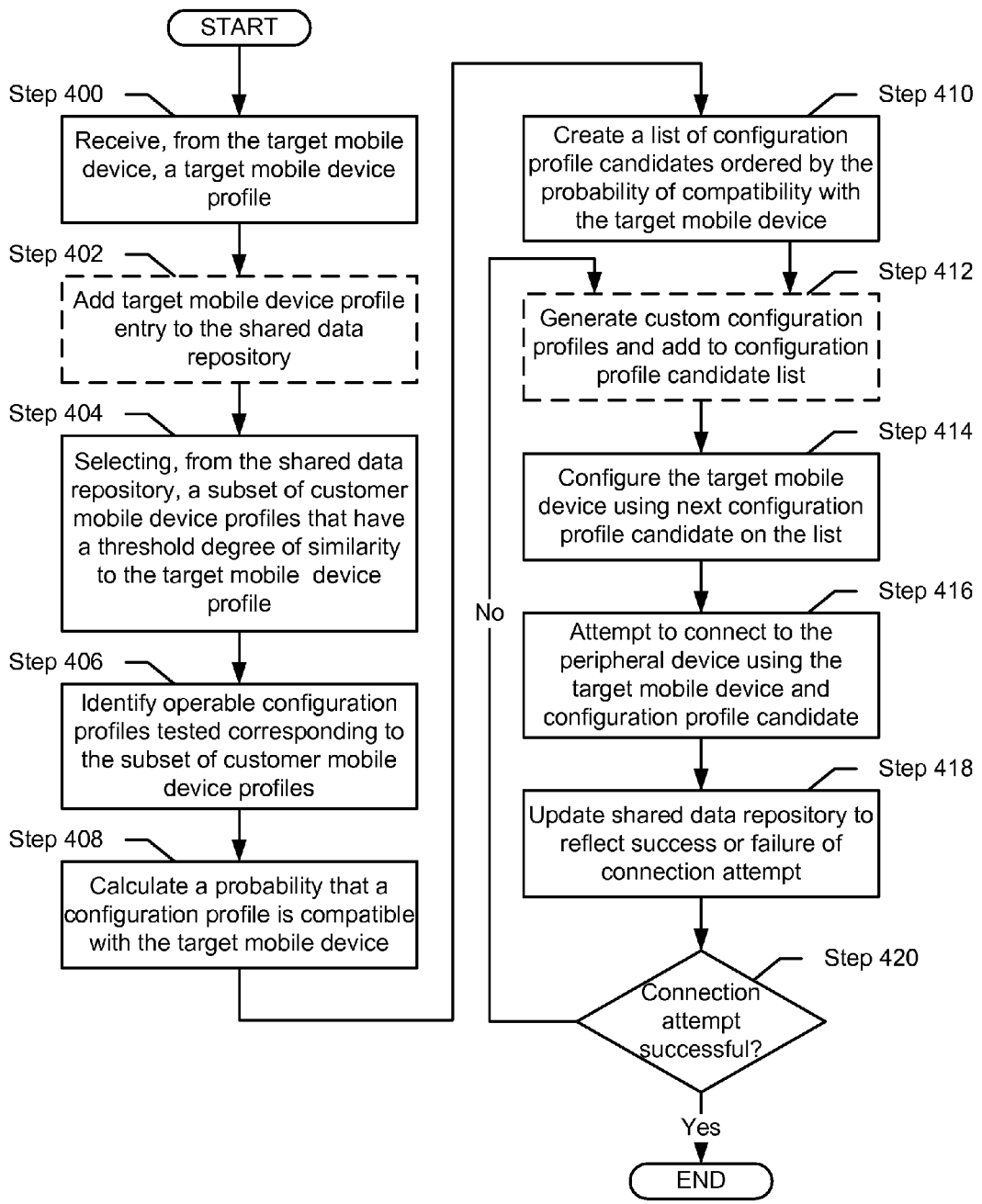
FIG. 4 shows a flowchart for selecting a configuration profile in accordance with one embodiment of the invention.

FIG. 4 shows a flowchart describing a method for selecting a configuration profile in accordance with one embodiment of the invention. In Step 400, a target mobile device profile is received from a target mobile device. The target mobile device may send the target mobile device profile in response to the installation or initialization of an application on the mobile device. Alternatively, the transmission may be initiated by a user of the target mobile device. In one or more embodiments of the invention, the entire target mobile device profile may not be received, but only specific parameters of the mobile device as required. In one or more embodiments of the invention, the configuration tool may send an instruction to the mobile device to transmit a specific device profile. The target mobile device profile may be generated by the target mobile device based upon the instruction. Further, upon receiving the target mobile device profile, the configuration tool may instruct the target mobile device to provide additional parameters specific to the mobile device.

In Step 402, if the shared data repository does not include an entry matching the target mobile device, a new entry is created using the target mobile device profile. In one or more embodiments of the invention, an individual entry is made for each individual mobile device for which a configuration profile is tested.

In Step 404, a subset of the customer mobile device profiles in the shared data repository is identified which has a threshold degree of similarity to the target mobile device profile. In one or more embodiments of the invention, the threshold degree of similarity may be defined as a number of identical or matching properties, a weighted score based on the identical or matching properties, or another metric. The subset of customer mobile device profiles may be identified by searching the shared data repository for customer mobile device profiles which match or are identical to a certain number of mobile device properties of the target mobile device profile. The subset of target mobile device properties against which the customer mobile device profiles are compared may be fixed. Alternatively, individual target mobile device properties may be weighted according to their correlation with compatible configuration profiles. The weighting may be determined based upon an analysis of similarities between customer mobile device profiles in the shared repository having those mobile device properties. In one or more embodiments of the invention, the threshold degree of similarity may be the number of identical parameters a customer mobile device profile has, or a weighted value of the identical parameters to the target mobile device. In one or more embodiments of the invention, the subset of customer mobile device profiles may be determined based on the presence of a single mobile device property in common with the target mobile device profile. In one or more embodiments of the invention, the subset of customer mobile device profiles may be selected by eliminating customer mobile device profiles with mobile device properties which the target mobile device profile does not have.

In Step 406, configuration profiles associated the subset of customer mobile devices selected are identified. The configuration profiles may be identified based on the lists of configuration profiles associated with each of the customer mobile device profiles. The configuration profiles identified may include every configuration profile which has been tested on any of the subset of customer mobile device profiles. Alternatively, the configuration profiles identified may only include those which were are compatible with at least one of the subset of customer mobile devices. In one or more embodiments, every configuration profile in the shared data repository may be a candidate for testing on the target mobile device at some point. In one or more embodiments of the invention, the configuration profiles may be identified based on configuration parameters which are associated with specific mobile device properties of the target mobile device profile, rather than successful testing on a customer mobile device having a threshold degree of similarity.

In Step 408, a probability that a given configuration profile will be compatible with the target mobile device is calculated based on the test results of the configuration profile on the subset of customer mobile devices with which the given configuration profile is compatible. The probability of compatibility may be calculated as a function of a percentage of customer mobile devices on which the configuration profile was operable, a level of similarity between the customer mobile devices on which the configuration profile was tested and the target mobile device, a number of customer mobile devices on which the configuration profile was tested, a correlation between target mobile device properties and the configuration parameters of the configuration profile, and/or other factors or a combination thereof. Calculating the percentage may include examining every customer mobile device profile to determine whether the configuration profile in question has been tested or not, and if so, whether the test was successful or not. In one or more embodiments of the invention, the percentage of customer mobile devices for which each configuration profile was operable may be weighted based on the number of customer mobile devices on which a configuration profile has been tested.

Alternatively, or additionally, the probability that a given configuration profile is compatible with a mobile device may be divided into categories, such as 'high probability', 'medium probability', and 'low probability'. The categories may be based on the percentage of customer mobile devices on which the configuration profile, as described above. Alternately, the categories may be based on the presence of certain mobile device properties within customer mobile device profiles. In one or more embodiments of the invention, a configuration profile may be associated with a 'fingerprint' based on similar characteristics of customer mobile device profiles for which similar test results were obtained from connection attempts performed with the configuration profile. The probability of compatibility may be based off a similarity between the target mobile device profile and the 'fingerprint'.

In Step 410, a list of configuration profile candidates is created. In one or more embodiments of the invention, the candidates in the list are ordered according to the probability that the candidates will be compatible with the target mobile device. The configuration profile candidates may consist of only the configuration profiles tested on the customer mobile devices having a threshold level of similarity to the target mobile device. Alternatively, the list may include every configuration profile candidate in the shared data repository. In one or more embodiments of the invention, the list may only include configuration profiles having a probability of compatibility above a pre-defined threshold.

In Step 412, custom configuration profiles may be generated and added to the list of configuration profile candidates. A custom configuration profile may be generated by modifying an existing configuration profile or by building a configuration profile from individual configuration parameters. In one or more embodiments of the invention, custom configuration profiles may only be generated if the list of configuration profile candidates has been exhausted. Alternatively, a custom configuration profiles may be opportunistically generated and seeded in the list according to a probability of compatibility with the target mobile device profile. In one or more embodiments of the invention, a plurality of configuration parameters may be passed to the mobile device, which may include functionality to generate and test custom configuration profiles autonomously. Generating custom configuration profiles may be performed as discussed below and in FIG. 5.

In Step 414, the target mobile device is configured using the configuration profile candidate having the highest probability of being compatible with the target mobile device. The configuration may be applied to the target mobile device by a client configuration tool executing on the target mobile device. Alternatively, the configuration settings may be passed to a peripheral device driver on the mobile device.

In Step 416, the target mobile device attempts to connect to the peripheral device using the configuration settings specified by the configuration profile candidate. A peripheral device driver executing on the target mobile device may perform the communication attempts with the peripheral device and report the success or failure to a client configuration tool managing the configuration locally. As part of attempting to connect, the target mobile device may attempt to use the functionality provided by the peripheral device. In other words, if the peripheral device is a card reader, the target mobile device may attempt to obtain information about a particular card read into the card reader. The result of the attempting to connect, and, thus in some embodiments, attempting to use the functionality of the mobile device, a modified test result is obtained. The modified test result may be a new test result or an update to an existing test result. The client configuration tool may pass the modified test result back to the configuration tool. Alternatively or additionally, the client configuration tool may perform the communication attempts. In one or more embodiments of the invention, multiple attempts to connect to the peripheral device may be performed. The multiple attempts may repeats of the same connection test or may include additional tests. In one embodiment of the invention, a single attempt to connect to the peripheral device may include multiple distinct tests. The multiple distinct tests may attempted successively according to a fixed order or be selected based on the results of previous connection attempts.

In Step 418, the shared data repository is updated to reflect the result of the connection attempted in Step 416. Updating the shared data repository may include modifying a device profile entry associated with the target mobile device to reflect the test and association with the configuration profile. If the configuration profile is custom, the configuration profile may be added to the shared data repository as well. In one or more embodiments of the invention, any calculated values associated with the configuration profile and device profile entry of the target mobile device, such as the correlation of specific parameters, may be updated to reflect the additional test results. The result collected from the target mobile device attempt to communicate with the peripheral device may include an indication of success or failure. Alternatively or additionally, the result may include other information on the communication attempt, such as the number of times the communication was attempted, signal strength, an error rate of the connection, a speed of the connection, power usage, and other information which might reflect the success or failure of a connection.

In Step 420, a determination is made as to whether the connection attempt was successful. If the connection attempt was unsuccessful, the next most probable configuration profile candidate on the list is selected. If the list has been exhausted, a custom configuration profile may be generated. If the connection attempt was successful, the configuration profile is used for the target mobile device. In one or more embodiments of the invention, all of the configuration profile candidates in the list may be tested, regardless of the success or failure of all earlier attempts.

FIG. 5 shows a flowchart for describing a method for generating a custom configuration profile in accordance with one embodiment of the invention.

In Step 500, target mobile device property is selected from the target mobile device profile. The target mobile device property may be selected based upon the outcome of a configuration profile test. Alternatively, the target mobile device property may be selected based on a disparity between the mobile device properties of a target mobile device profile and one or more customer mobile device profiles with a threshold of similarity to the target mobile device profile. In one or more embodiments of the invention, correlations between some or all mobile device properties and some or all configuration parameters may be calculated.

In Step 502, customer mobile device profile entries which have the target mobile device properties are identified. The customer mobile device profiles entries may be identified by searching the shared data repository. In one or more embodiments of the invention, in addition to storing all configuration profile test result data relative to device profiles, the shared data repository may also include test result data stored relative to individual mobile device properties.

In Step 504, configuration profiles associated with the customer mobile device profile entries having the target mobile device property are identified. Similar to the method discussed above, the configuration profiles may be identified based on the lists of tested configuration profiles associated with each customer mobile device profile entry.

In Step 506, the configuration profiles are analyzed to identify a specific configuration parameter which is highly correlated with the target mobile device property. The correlation may be calculated based on the probability of a configuration profile being operable on a customer mobile device having the target mobile device property and probability of the configuration profile including a given configuration parameter. If both probabilities exceed a certain threshold, the given configuration parameter is highly correlated with the target mobile device property.

In Step 508, a seed configuration profile is identified from the list of configuration profiles candidates. The seed configuration profile may be generated as discussed above with reference to FIG. 4. In one or more embodiments of the invention, the seed configuration profile may be the configuration profile candidate with the highest probability of compatibility with the target mobile device. In one or more embodiments of the invention, the seed configuration profile may specifically lack the configuration parameter identified in Step 506. In one or more embodiments of the invention, the seed configuration profile may have been successfully tested on the target mobile device, and the addition of the configuration parameter may potentially improve the functionality or efficacy of the configuration profile. Alternatively, the seed configuration profile may have failed in a quantifiable way correlated to not having the configuration profile.

In Step 510, the seed configuration profile is modified to include the configuration parameter. The modification may include adding the configuration parameter as a new field to the seed configuration profile. Alternatively, the target-correlated configuration parameter may replace some existing configuration parameter within the seed configuration profile. In one or more embodiments of the invention, additional existing configuration parameters may be removed to facilitate the addition of the target-correlated configuration parameter.

In Step 512, the modified seed configuration profile is added to the list of configuration profile candidates. In one or more embodiments of the invention, one or more target-correlated configuration parameters may be passed to the target mobile device independent of a seed configuration profile, and the target mobile device may include functionality to modify various aspects of a configuration profile candidate to attempt to maximize the probability of compatibility with the target mobile device.

Figure 6:
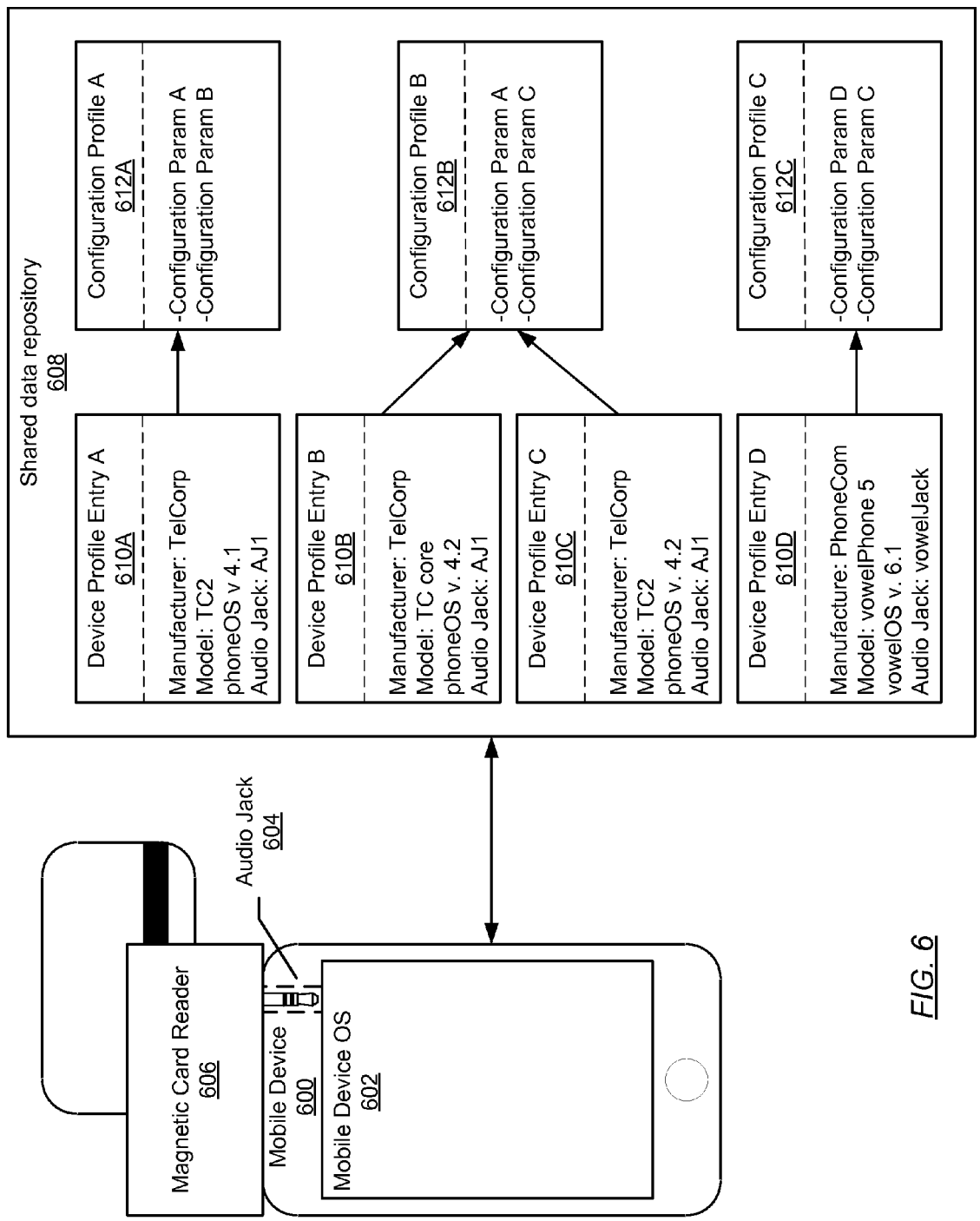
FIG. 6 shows an example in accordance with one embodiment of the invention.

FIG. 6 shows an example of obtaining a configuration profile for connecting a mobile device to magnetic card reader in accordance with one embodiment of the invention. The example is for explanatory purposes only and not intended to limit the scope of the invention.

A magnetic card reader (606) is a peripheral device which connects to a mobile device (600) via the audio jack (604) of the mobile device (600). The magnetic card reader is accessed via an application (not shown) executing on the mobile device OS (602) of the mobile device (600) which provides a user interface for managing the magnetic card reader (606) and a back end for communicating with a financial system in order to verify credits cards. After initial installation on the mobile device (600), the application must obtain an appropriate configuration profile (612A, 612B, 612C) in order to communicate with the magnetic card reader (106). First the application collects various mobile device properties of the mobile device (600). The mobile device (600) is a model TC3 smart phone manufactured by TelCorp. The mobile device OS (602) is phoneOS version 4.2. The mobile device has a vowelJack model audiojack (604).

Once the application has collected the various mobile device properties into a mobile device profile, the mobile device profile is sent to a configuration server via a network connection of the mobile device (600). The configuration server is connected to a shared data repository (608) in which multiple device profile entries (610A, 610B, 610C, 610D), collected from applications executing on other mobile devices, are stored. The each of the device profile entries (610A, 610B, 610C, 610D) is associated with a configuration profile (612A, 612B, 612C). For the sake of the example, all of the configuration profiles (612A, 612B, 612C) have been tested on all of the mobile devices represented by the device profile entries (610A, 610B, 610C, 610D). The arrows represent a configuration profile (612A, 612B, 612C) compatible with the mobile device represented by a device profile entry (610A, 610B, 610C, 610D).

First, a search is performed for a device profile entry (610A, 610B, 610C, 610D), exactly matching the device profile of the mobile device (600). When none is found, a new device profile entry (610A, 610B, 610C, 610D), is created and added to the shared data repository (608).

Next, a subset of device profile entries (610A, 610B, 610C, 610D) having a threshold of similarity to the mobile device (600) is selected. Device profile entry A (610A) shares the manufacturer and OS of the mobile device, giving a similarity value of 2. Device profile entries B and C (610B, 610C) both share the manufacturer, OS, and OS version of the mobile device for similarity values of 3. Finally, device profile entry D (610D) shares only the audiojack model for a similarity value of 1. Since the similarity threshold for determining the subset dictates a similarity value of 2 or greater, the subset consists of device profile entries A, B, and C (610A, 610B, 610C). The configuration profile candidates consist of configuration profiles A and B (612A, 612B) which are associated with device profiles entries A, B, and C (610A, 610B, 610C). Since configuration profile B (612B) is compatible with the highest percentage of the subset of device profile entries (610A, 610B, 610C), configuration profile B (612B) is tested on the mobile device (600) first.

The mobile device (600) is configured according to configuration profile B (612B). The application attempts to initiate communication with the magnetic card reader (606). The magnetic card reader (606) fails to acknowledge, and the test is reported as unsuccessful to the configuration server. The recently created device profile entry for the mobile device is updated to reflect the test result. Next, the mobile device is configured according to configuration profile A. The application attempts to initiate communication with the magnetic card reader (606) and again magnetic card reader (606) fails to acknowledge the communication. The test is reported as unsuccessful to the configuration server, and the device profile entry for the mobile device is updated.

Having exhausted the list of configuration profile candidates, the configuration server generates a custom configuration profile. Based on an analysis of the mobile device profile and the subset of device profile entries (610A, 610B, 610C), the audio jack is selected as a mobile device property on which to modify configuration parameter. Device profile entry D (610D) is the only device profile entry (610A, 610B, 610C, 610D) which shares the mobile device property. Based on device profile entry D (610D) and configuration profile C (612C), configuration parameter D is identified as potentially correlated with the audio jack type. Since configuration profile B (612B) was previously found to be the most likely compatible candidate, and does not currently include configuration parameter D, configuration profile B (612B) is selected as the seed configuration profile. Configuration profile B (612B) is modified to include configuration parameter D. The mobile device (600) is configured using the modified configuration. The mobile device (600) attempts to communicate with the magnetic card reader (606) and receives an acknowledgement. The result is transmitted to the configuration server. Since modified configuration profile B is custom, a new configuration profile entry is created and associated with the device profile entry for the mobile device.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by one or more computer processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for obtaining a configuration profile comprising:
    obtaining, from a plurality of customer mobile devices, a plurality of test results for a plurality of customer-tested configuration profiles, wherein the plurality of customer-tested configuration profiles comprises a plurality of operable configuration profiles;
    populating a shared data repository with the plurality of test results and the plurality of customer-tested configuration profiles, wherein the plurality of customer-tested configuration profiles are related in the shared data repository to a plurality of customer mobile device profiles of the plurality of customer mobile devices;
    receiving, from a target mobile device, a target mobile device profile, wherein the target mobile device profile describes a plurality of mobile device properties of the target mobile device;
    selecting, from the shared data repository, a subset of the plurality of customer mobile device profiles based on each customer mobile device profile in the subset having a threshold degree of similarity to the target mobile device profile;
    calculating, for each of the plurality of operable configuration profiles defined for the subset, a probability of compatibility with the target mobile device;
    testing, in an order defined by the probability of compatibility, on the target mobile device, the plurality of operable configuration profiles defined for the subset to obtain a modified test result; and
    updating the shared data repository with the modified test result.

2. The method of claim 1, wherein calculating the probability of compatibility for an operable configuration profile of the plurality of operable configuration profiles further comprises:
    identifying, for the subset of the plurality of customer mobile device profiles, a percentage of the subset of the plurality of customer mobile device profiles with which the operable configuration profile is compatible.

3. The method of claim 1, wherein each customer mobile device profile in the subset has the threshold degree of similarity to the target mobile device profile when the customer mobile device profile comprises a predefined number of the plurality of mobile device properties.

4. The method of claim 3,
    wherein a configuration profile comprises a plurality of configuration parameters, and
    wherein each of the configuration parameters corresponds to a setting of the target mobile device.

5. The method of claim 4, further comprising:
    identifying an additional target mobile device property;
    identifying, within the shared data repository, a plurality of additional device profiles which include the additional mobile device property;
    calculating, for a given configuration parameter and the additional mobile device property, a percentage of mobile devices having the additional mobile device property which successfully connected to a peripheral device using the given configuration parameter;
    identifying, based on a correlation between the given configuration parameter and the additional mobile device property, a related configuration parameter; and
    selecting, from the plurality of configuration profile candidates, a seed configuration profile.

6. The method of claim 5, further comprising:
    modifying the seed configuration profile to obtain a modified seed configuration profile comprising the related configuration parameter; and
    appending the modified seed configuration profile to the list of configuration profile candidates.

7. The method of claim 5, further comprising:
    providing the seed configuration profile and a plurality of additional configuration parameters associated with a plurality of additional mobile device properties to the target mobile device; and
    generating, by the target mobile device, a custom configuration profile using the seed configuration profile and the plurality of additional configuration profiles.

8. The method of claim 1, wherein updating the shared data repository comprises:
    creating an entry in the shared data repository comprising the target mobile device profile, and
    associating a current configuration profile candidate with the entry based on the outcome.

9. A system for obtaining a configuration profile comprising:
    a computer processor;
    a shared data repository storing:
        a plurality of customer mobile device profiles representing a plurality of customer mobile devices, and
        a plurality of customer-tested configuration profiles, comprising a plurality of operable configuration profiles; and
    a server configuration tool, executing on the computer processor and configured to:
        obtain, from the plurality of customer mobile devices, a plurality of test results for the plurality of customer-tested configuration profiles,
        populate the shared data repository with the plurality of test results, wherein the plurality of customer-tested configuration profiles are related in the shared data repository to the plurality of customer mobile device profiles, receive, from a target mobile device, a target mobile device profile, wherein the target mobile device profile describes a plurality of properties of the target mobile device, select, from the shared data repository, a subset of the plurality of customer mobile device profiles based on each customer mobile device profile in the subset having a threshold degree of similarity to the target mobile device profile, calculate, for each of the plurality of operable configuration profiles defined for the subset, a probability of compatibility with the target mobile device, test, in an order defined by the probability of compatibility, on the target mobile device, the plurality of operable configuration profiles defined for the subset to obtain a modified test result, and update the shared data repository with the modified test result.

10. The system of claim 9, further comprising:
the target mobile device, comprising connection hardware and the target mobile device profile; and
a peripheral device connected to the target mobile device by the connection hardware, wherein the plurality of operable configuration profiles is to connect the target mobile device to the peripheral device.

11. The system of claim 10, further comprising:
a client configuration tool, executing on the target mobile device, and configured to:
obtain the target mobile device profile; and
transmit, to the server configuration tool, the target mobile device profile.

12. The system of claim 9, wherein the client configuration tool further comprises functionality to:
obtain, from the server configuration tool, a configuration profile candidate;
configure the target mobile device based on the configuration profile candidate;
obtain the modified test result by determining whether the configuration profile candidate is operable on the target mobile device; and
transmit the modified test result to the server configuration tool.

13. The system of claim 12, further comprising:
a peripheral device driver, executing on the mobile device, and configured to:
obtain the configuration profile candidate from the client configuration tool; and
attempt to communicate with the peripheral device using the connection hardware and the configuration profile candidate.

14. The system of claim 9, wherein the server configuration tool is further configured to:
calculate, for a given configuration parameter and a given mobile device property, a percentage of the plurality of customer mobile device profiles having the given mobile device property which successfully connected to the peripheral device using the given configuration parameter;
identify, based on a correlation between the given configuration parameter and the given mobile device property, a related configuration parameter;
select, from the plurality of configuration profile candidates, a seed configuration profile; and
transmit, to the target mobile device, the seed configuration profile and the related configuration parameter.

15. The system of claim 14, wherein the client configuration tool is further configured to:

obtain, from the server configuration tool, the seed configuration profile and the related configuration parameter;
generate, using the seed configuration profile and the related configuration parameter, a custom configuration profile;
configure the target mobile device based on the custom configuration profile;
obtain a new custom test result by determining whether the custom configuration profile was operable on the target mobile device; and
transmit the new test custom result and the custom configuration profile to the server configuration tool.

16. A non-transitory computer readable medium storing instructions for obtaining a configuration profile, the instructions comprising functionality to:
obtain, from a plurality of customer mobile devices, a plurality of test results for a plurality of customer-tested configuration profiles, wherein the plurality of customer-tested configuration profiles comprises a plurality of operable configuration profiles;
populate a shared data repository with the plurality of test results and the plurality of customer-tested configuration profiles, wherein the plurality of customer-tested configuration profiles are related in the shared data repository to a plurality of customer mobile device profiles of the plurality of customer mobile devices;
receive, from a target mobile device, a target mobile device profile, wherein the target mobile device profile describes a plurality of mobile device properties of the target mobile device;
select, from the shared data repository, a subset of the plurality of customer mobile device profiles based on each customer mobile device profile in the subset having a threshold degree of similarity to the target mobile device profile;
calculate, for each of the plurality of operable configuration profiles defined for the subset, a probability of compatibility with the target mobile device;
test, in an order defined by the probability of compatibility, the plurality of operable configuration profiles defined for the subset to obtain a modified test result; and
update the shared data repository with the modified test result.

17. The non-transitory computer readable medium of claim 16,
wherein each customer mobile device profile in the subset has the threshold degree of similarity to the target mobile device profile when the customer mobile device profile comprises a predefined number of the plurality of mobile device properties.

18. The non-transitory computer readable medium of claim 17,
wherein a configuration profile comprises a plurality of configuration parameters, and
wherein each of the configuration parameters corresponds to a setting of the target mobile device.

19. The non-transitory computer readable medium of claim 18, the instructions further comprising functionality to:
identify an additional mobile device property;
identify, within the shared data repository, a plurality of additional device profiles which include the additional mobile device property;
calculate, for a given configuration parameter and the additional mobile device property, a percentage of mobile devices having the additional mobile device property which successfully connected to the peripheral device using the given configuration parameter;

identify, based on a correlation between the given configuration parameter and the additional mobile device property, a related configuration parameter; and select, from the plurality of configuration profile candidates, a seed configuration profile.

20. The non-transitory computer readable medium of claim 19, the instructions further comprising functionality to:

modify the seed configuration profile to obtain a modified seed configuration profile comprising the related configuration parameter; and append the modified seed configuration profile to the list of configuration profile candidates.

\* \* \* \* \*